(12) United States Patent
Pollastro

(10) Patent No.: US 7,856,430 B1
(45) Date of Patent: Dec. 21, 2010

(54) METHOD FOR GENERATING INCREASED NUMBERS OF LEADS VIA THE INTERNET

(76) Inventor: Paul J. Pollastro, 833 Neely Heights Ave., Coraopolis, PA (US) 15108

( * ) Notice: Subject to any disclaimer, the term of this patent is extended or adjusted under 35 U.S.C. 154(b) by 242 days.

(21) Appl. No.: 11/944,153

(22) Filed: Nov. 21, 2007

(51) Int. Cl.
*G06F 17/30* (2006.01)

(52) U.S. Cl. .................. 707/709; 707/712; 707/758; 707/781; 705/29

(58) Field of Classification Search .......... 707/609, 707/706, 709, 712, 758, 781, 802; 715/205, 715/206, 208, 224; 705/14.69, 28, 29
See application file for complete search history.

(56) References Cited

U.S. PATENT DOCUMENTS

| | | | |
|---|---|---|---|
| 5,706,434 | A | 1/1998 | Kremen et al. |
| 6,301,614 | B1 | 10/2001 | Najork et al. |
| 6,453,306 | B1 | 9/2002 | Quelene |
| 6,547,829 | B1 | 4/2003 | Meyerzon et al. |
| 6,718,365 | B1 | 4/2004 | Dutta |
| 6,910,077 | B2 | 6/2005 | Najork |
| 7,139,747 | B1 | 11/2006 | Najork |
| 7,200,677 | B1 | 4/2007 | Allen et al. |
| 7,228,360 | B2 | 6/2007 | Allen et al. |
| 7,356,762 | B2 * | 4/2008 | van Driel ............... 715/206 |
| 2002/0147743 | A1 * | 10/2002 | Le et al. ............... 707/505 |
| 2007/0079229 | A1 * | 4/2007 | Johnson, II ............ 715/501.1 |

OTHER PUBLICATIONS

Berners-Lee, T. et al., Uniform Resource Locators (URL), Dec. 1994, University of Minnesota Eds.

* cited by examiner

*Primary Examiner*—Fred I Ehichioya
(74) *Attorney, Agent, or Firm*—Thorp Reed & Armstrong, LLP; Paul D. Bangor, Jr.; Stephen H. Montgomery

(57) ABSTRACT

A method for generating increased numbers of leads, such as sales leads for data items such as part numbers, ISBN numbers, automotive part numbers, electronic part numbers, phone numbers, zip codes, drivers license numbers, document numbers, keywords, etc., via the Internet. The method includes receiving data items, such as part numbers, from two or more subscribers and/or authorized users; generating an index of non-duplicative data items, such as part numbers, from the received data items or part numbers; listing each of the non-duplicative data items or part numbers as a data item hyperlink or a part number hyperlink on Web page; and generating a Web page for any activated data item hyperlink or activated part number hyperlink, wherein the generated Web page includes one or more components each of which incorporates the part number from the activated data item hyperlink or activated part number hyperlink and is selected from the group consisting of a title, a URL, a meta-tag and a text entry. Each generated Web page also preferably has a URL that has been rewritten as a static URL. The preferred method may also include including a prompt for issuing a request for quotation or an order relating to the data item or part number in each generated Web page; and sending an issued request for quotation or order relating to a particular part number to each of the plurality of subscribers and/or authorized users from whom that part number was received.

17 Claims, 7 Drawing Sheets

METHOD FOR GENERATING INCREASED NUMBERS OF LEADS VIA THE INTERNET

BACKGROUND OF THE INVENTION

1. Field of the Invention

The present invention relates generally to the field of generating sales leads. In particular, embodiments of the present invention relate to a system and method for increasing the number of sales leads generated from part numbers of numerous types resident on various Web sites, computers servers, memory devices and/or other devices accessible via the Internet and the world wide web.

2. Description of the Related Art

There are more than a billion documents available on the World Wide Web from the list of hyperlinked data of ("Web") over the Internet and this number continues to rapidly increase. These documents ("Web pages") are stored as files on Web servers. Each of these Web pages has a unique Web address. These addresses are also called Uniform Resource Locators (URLs) or Universal Resource Locators (URLs). URLs are more fully explained in RFC 1738 "Uniform Resource Locators (URL) Berners-Lee, Masinter & McCahill."

An Internet device, such as a computer using a Web browser, typically accesses a specific Web page by providing its unique Web address (e.g., a URL). That Web page is a file stored on a Web server. The file is simply downloaded without change to the requesting Internet device and displayed through a web browser that can read the source code. Every device accessing the file sees the same results. The stored file remains unchanged until an authorized user actively modifies the file. These types of Web pages are typically called "static." A typical URL for a static Web page looks like this: "http://subdomain.domain.com/pagename.htm". The "http://" is the value of the scheme field and it identifies the protocol scheme being used to transmit over the Internet. For the Web, the protocol scheme typically is HyperText Transfer Protocol (HTTP). The "subdomain.domain.com" is the value of the hostname field and it identifies the domain (or the Web server) that hosts the Web page addressed by the static URL. The actual format of this field depends upon the domain name conventions observed. Typically, the format includes a domain name and an extension (e.g., microsoft.com).

The "pagename" is the value of the path field and/or the file-name field. It may include a path to the specific Web page. It includes the file name of the specific Web page. The ".htm" or ".html" is the value of the file-extension field and it identifies the language of the file. In this example, the language of the static file is the most common format for a Web page: HyperText Markup Language (HTML).

Dynamic Web Pages and Dynamic Addressing

The opposite of a static Web page is a "dynamic" Web page. A dynamic Web page is one that is created the moment the page is accessed and it is usually created based upon data in a database. Unlike a static Web page, a dynamic Web page that a viewer sees is not stored intact on a Web Server. Instead, a dynamic Web page is generated anew each time it is accessed.

A dynamic Web page is generated based upon a stored file containing instructions and an associated database. Therefore, each instance of a generated dynamic Web page may be different from a previously generated page using the same address. There are many different implementations of dynamic Web pages. The implementation differs from each other in the set of instructions used in the stored file on the Web server and the type of database accessed. An example of such an implementation includes Active Server Pages (ASP) by the Microsoft Corporation. A typical URL for a dynamic Web page may look like this: "http://subdomain.domain.com/pagename.asp?parm1=val1&parm2=val2". This example uses an ASP implementation. The protocol scheme, hostname, path, and filename fields are the same as those fields in the static URL. However, there are fields in a dynamic address that are different from fields in a static address.

The extension ".asp" is a value of a file-extension field and identifies the language of the dynamic-page-generation instructions. The extension ".asp" indicates that the page is formatted as an Active Server Page (ASP) and is generated by using the "asp" script engine on the server. The "?" symbol is a signal that the URL points to a dynamic page and it separates the portion of the dynamic URL referring to a specific file and the portion of the URL containing parameters.

The "parm1=" and "parm2=" elements identify the names of categorized parameter. The values of these parameters are used to generate the dynamic Web page. "val1" and "val2" are the values of the parameters. The values are typically used to access items in a database. A parameter consists of a parameter name and its associated value. There can be a series of many parameters. The "&" symbol separates each parameter from the other parameters.

Web Search Engines and Spiders

No central bibliographic authority exists to catalog the information found on the tens of millions of Web sites on the Internet. Generally, two basic approaches are available for finding the proverbial needle in this immense Web haystack: a subject directory or a search engine. Subject directories, such as "DMOZ" and "MSN", MSN being a hybrid engine, catalog Web pages and organize them by subject. Each Web page is manually (or automatically) analyzed and categorized. Users can browse through the various categories and subcategories in the subject directories to find a Web site on a particular topic. Typically, Web pages are categorized and added to the directory by professional Web searchers or by user submissions.

A search engine provides a searchable database of indexed keywords. A search engine examines Web pages for specified keywords and returns a list of the Web pages where the keywords were found. Although search engines are general class of programs, the term is often used to specifically describe systems like "Google" "Yahoo" and "Live Search (MSN)" that enable users to search for Web pages on the Web.

A search engine includes two main parts: index searcher and index generator. An index searcher includes a database of indexing keywords of Web pages and logic for searching that database. An index generator includes a "spider" for gathering Web pages and an "indexer" for generating an index into those pages.

Typically, a search engine works by sending out the spider to fetch as many pages as possible. The indexer then reads these pages and creates an index based on the words contained in each page. Each search engine typically uses a proprietary algorithm to create its indices such that, ideally, only meaningful results are returned for each query.

Spiders are sometimes referred to as "Web-spiders", "robots", "Web wanderers", "crawlers", "Web-crawler", etc." These alternative names refer to programs that have the same basic functionality to visit Web sites by requesting documents from them.

A spider will "crawl" a Web page by following links found on the page. Normal Web browsers (e.g., "Internet Explorer") are not spiders, because they are operated by humans, and don't automatically retrieve referenced documents. Provided with a page by a spider, an indexer parses the document and inserts selected keywords into the database with references back to the original location of the source page. How this is accomplished depends on the indexer. Some indexers index the titles of the Web pages or the first few paragraphs. Some parse the entire contents and index all words. Some parse the meta-tag or other special hidden tags.

Meta-tags are special HTML tags that provide information about a Web page. Unlike normal HTML tags, meta-tags do not affect how the page is displayed. Instead, they provide information such as who created the page, how often it is updated, what the page is about, and which keywords represent the page's content. Many search engines use this information when building their indices.

When visiting a Web site, most spiders will check a file called the "robots.txt" file. This file informs the spider whether the spider is authorized to search the site and if so authorized, which pages on the site to retrieve. Single-destination Web sites called "portals" are often a combination of a "subject directory" and a "search engine" (a hybrid). These portals include a search engine (with its spider and indexer) or are closely associated with a third-party search engine. These portals often include an organized and customized subject directory.

The Invisible Web is made up of information stored in Web databases. Unlike pages on the visible Web, information in databases is generally inaccessible to the spiders to compile search engines. Search engines typically index the Web by visiting Web pages and indexing their content. In particular, the spiders use the links found on pages to find new Web pages. The links include static URLs. Most spiders tend to ignore the content of a dynamic Web address and thus, the contents of the referenced dynamic Web page. These dynamic Web pages are often ignored because the format of their dynamic URL is typically different from the URL format of a static Web page. A dynamic URL includes parameters which can be recognized by the spider. Spiders are often specifically programmed to ignore dynamic addresses because of the complexity of navigating through dynamic pages and the inability to keep clean and accurate data. The information found in the databases of dynamic Web sites is typically not indexed by search engines. Therefore, these dynamic Web sites are not found by those using search engines to search the Web. This huge, unmapped region of the Internet is called the "Invisible Web."

Accordingly, there is a need for systems and methods that entice Web crawlers to index Web sites containing large databases of inventoried part numbers, such as aviation part numbers, book ISBNs, automotive part numbers, electronic part numbers, phone numbers, zip codes, drivers license numbers, document numbers, etc., (which to a search engine is read as a basic keyword search) such that increased sales leads are generated for those Web sites and/or subscribers thereto and/or for authorized users thereof when a potential customer employs a search engine to search for one or more of the part numbers.

SUMMARY OF THE INVENTION

The present invention comprises systems and methods for generating increased numbers of leads, such as sales leads for data items such as part numbers, ISBN numbers, automotive part numbers, electronic part numbers, phone numbers, zip codes, drivers license numbers, document numbers, keywords, etc., via the Internet. In one aspect, the present invention comprises a computer implemented method comprising receiving a plurality of data items from one or more sources; listing each of the plurality of data items as a data item hyperlink on a Web page; and generating a data item Web page for any activated data item hyperlink wherein the data item Web page includes one or more parts each of which incorporates the data item from said activated data item hyperlink and is selected from the group consisting of a title, a URL, a meta-tag and a text entry. Preferably the receiving is implemented via one or more BLOB fields and each generated data item Web page includes a prompt for issuing a request for quotation or an order relating to one of the data items comprising a part number. In addition, each generated data item Web page preferably includes a static URL.

In another aspect, the present invention comprises a computer implemented method comprising receiving a plurality of data items from one or more sources; generating an index of non-duplicative data items from the received plurality of data items; listing each of the non-duplicative data items as a data item hyperlink on a Web page; and generating a data item Web page for any activated data item hyperlink wherein the data item Web page includes one or more parts each of which incorporates the data item from the activated data item hyperlink and is selected from the group consisting of a title, a URL, a meta-tag and a text entry. Here again, the receiving is preferably implemented via one or more BLOB fields and each generated data item Web page preferably includes a prompt for issuing a request for quotation or an order relating to one of the data items comprising a part number. In addition, each generated data item Web page preferably includes a static URL.

In still a further aspect, the present invention comprises a computer implemented method comprising receiving part numbers from one or more sources; generating an index of non-duplicative part numbers from the received part numbers; listing each of the non-duplicative part numbers as a part number hyperlink on a Web page; and generating a Web page for any activated part number hyperlink wherein the generated Web page includes one or more components each of which incorporates the part number from the activated part number hyperlink and is selected from the group consisting of a title, a URL, a meta-tag and a text entry. Yet again, the receiving is preferably implemented via one or more BLOB fields and each generated Web page preferably includes a prompt for issuing a request for quotation or an order relating to one of the part numbers. In addition, each generated Web page preferably includes a static URL.

In yet another aspect, the present invention comprises a computer implemented method comprising issuing unique access credentials to each of a plurality of authorized users of a Web site; receiving part numbers from two or more of the plurality of authorized users; generating an index of non-duplicative part numbers from the received part numbers; listing each of the non-duplicative part numbers as a part number hyperlink on a Web page of said Web site; and generating a Web page for any activated part number hyperlink wherein the generated Web page includes one or more components each of which incorporates the part number from the activated part number hyperlink and is selected from the group consisting of a title, a URL, a meta-tag and a text entry. Again, the receiving is preferably implemented via one or more BLOB fields and each generated Web page preferably includes a prompt for issuing a request for quotation or an order relating to one of the part numbers. Also, an issued request for quotation relating to a first part number is preferably sent to each of the plurality of authorized users from whom the first part number was received. Further, each generated Web page preferably includes a static URL.

BRIEF DESCRIPTION OF THE DRAWINGS

The above and other objects and advantages of the present invention will become apparent from the following description when read in conjunction with the accompanying drawings wherein.

DETAILED DESCRIPTION OF THE PREFERRED EMBODIMENTS

The foregoing is to be construed as only being an illustrative embodiment of this invention. Persons skilled in the art can easily conceive of alternative arrangements providing functionality similar to this embodiment without any deviation from the fundamental principles or the scope of this invention.

The systems and methods of the present invention provide increased exposure and generation of sales leads for entities marketing products, particularly by part numbers, ISBN numbers, automotive part numbers, electronic part numbers, phone numbers, zip codes, drivers license numbers, document numbers or the like over the Internet. Typical Web-based marketplace sites provide only limited exposure or generation of sales leads in that a customer looking for a particular product generally must be aware of and/or subscribe to the marketplace site in order to search for a particular product by part number on such website. In addition, customer searches for the part number on Internet search engines generally will not return a high ranking in the search results for an entity's website or listing on a marketplace website due to the manner in which such websites are organized. Further, from the perspective of the customer or searcher, many of the high ranking results returned by Internet search engines do not provide convenient sources where the sought after part(s) can be obtained with little additional effort or leg work.

Figure 1:
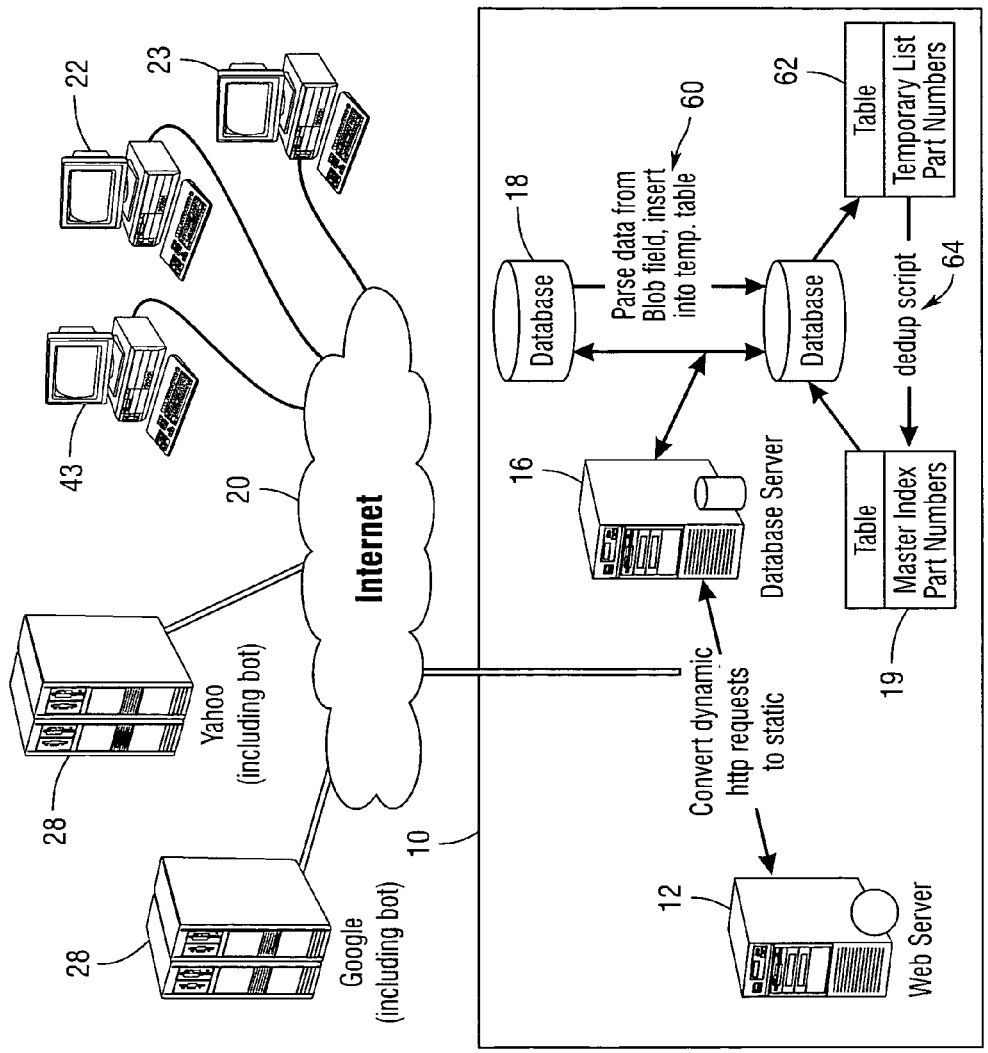
FIG. 1 illustrates a preferred embodiment of a system of the present invention.
Figure 5:
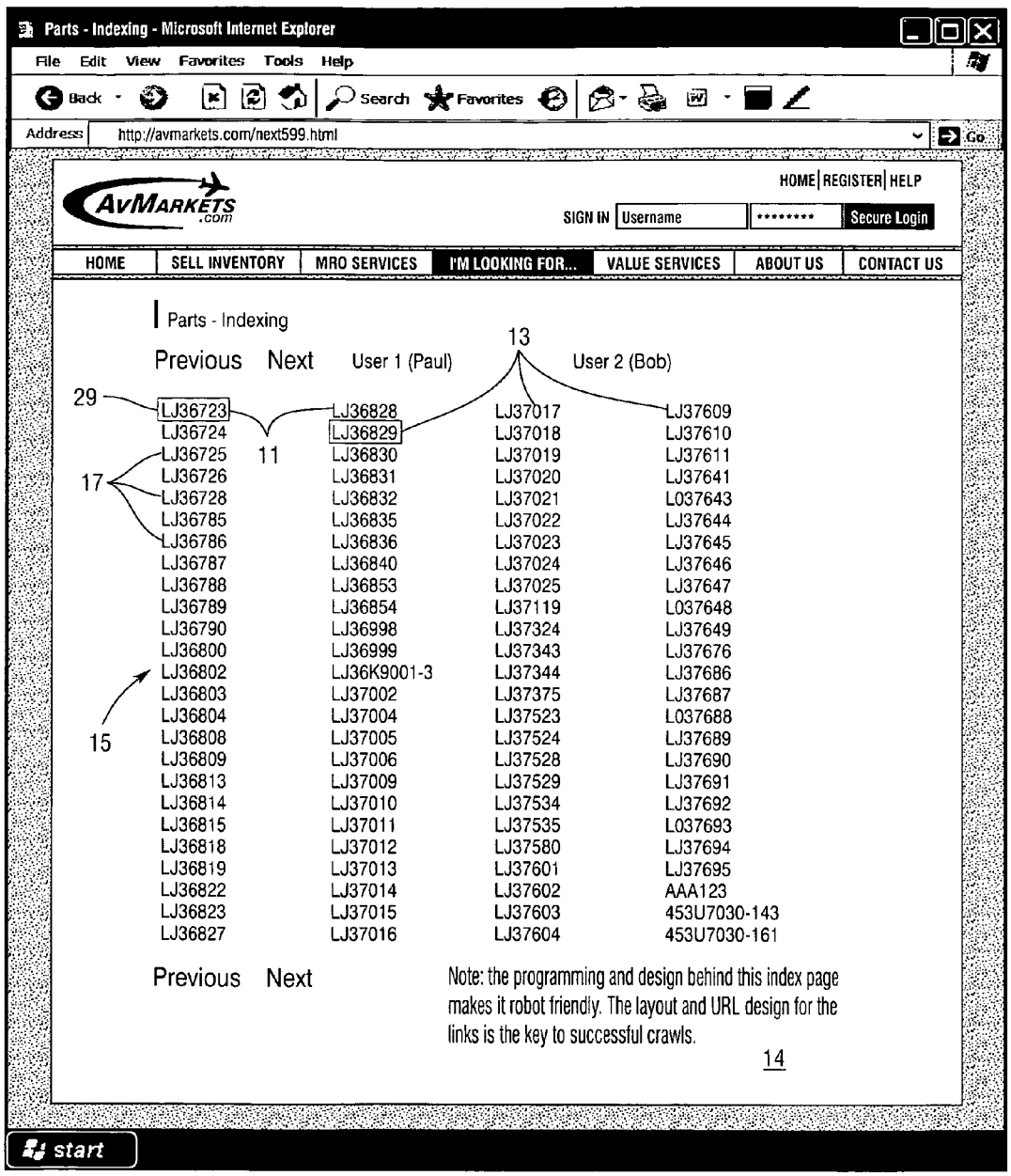
FIG. 5 is a screen shot of an exemplary dynamic Web page converted to a static Web page containing a list of hyperlinked data items of the system of the present invention that generally is open to the public and/or to web crawlers where no login or access authorization is necessary.

A preferred embodiment of a system 10 according to the present invention is shown in FIG. 1. System 10 comprises a web server 12 or similar computer. A web page 14 is maintained on server 12 is shown in FIGS. 1 and 5. Database server 16 preferably comprises a hard disk device and database software. Database server 16 preferably stores a master index 19 of all the non-duplicative data, such as aviation part numbers or keywords. Database server 16 also stores a database table 18 of data from subscribers 22 and 23 who have input their data into the Database server 16 via the Internet 20 to the system 10.

Figure 2:
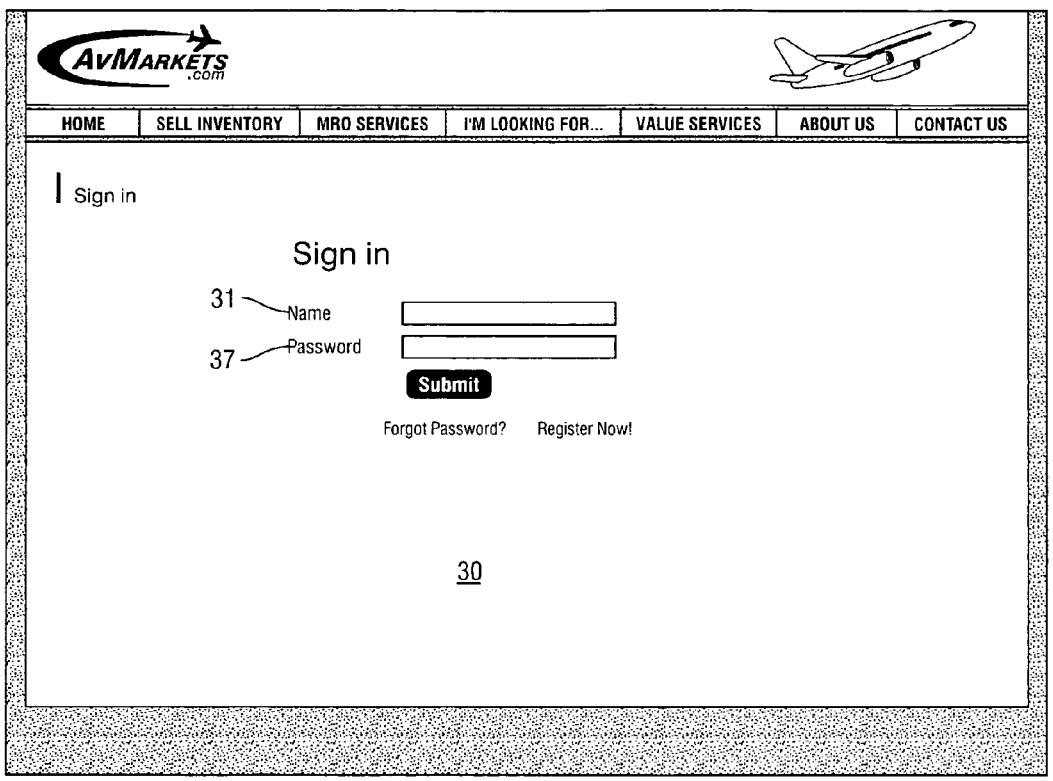
FIG. 2 is a screen shot of an exemplary login page for a subscriber or authorized user of the system of the present invention.
Figure 3:
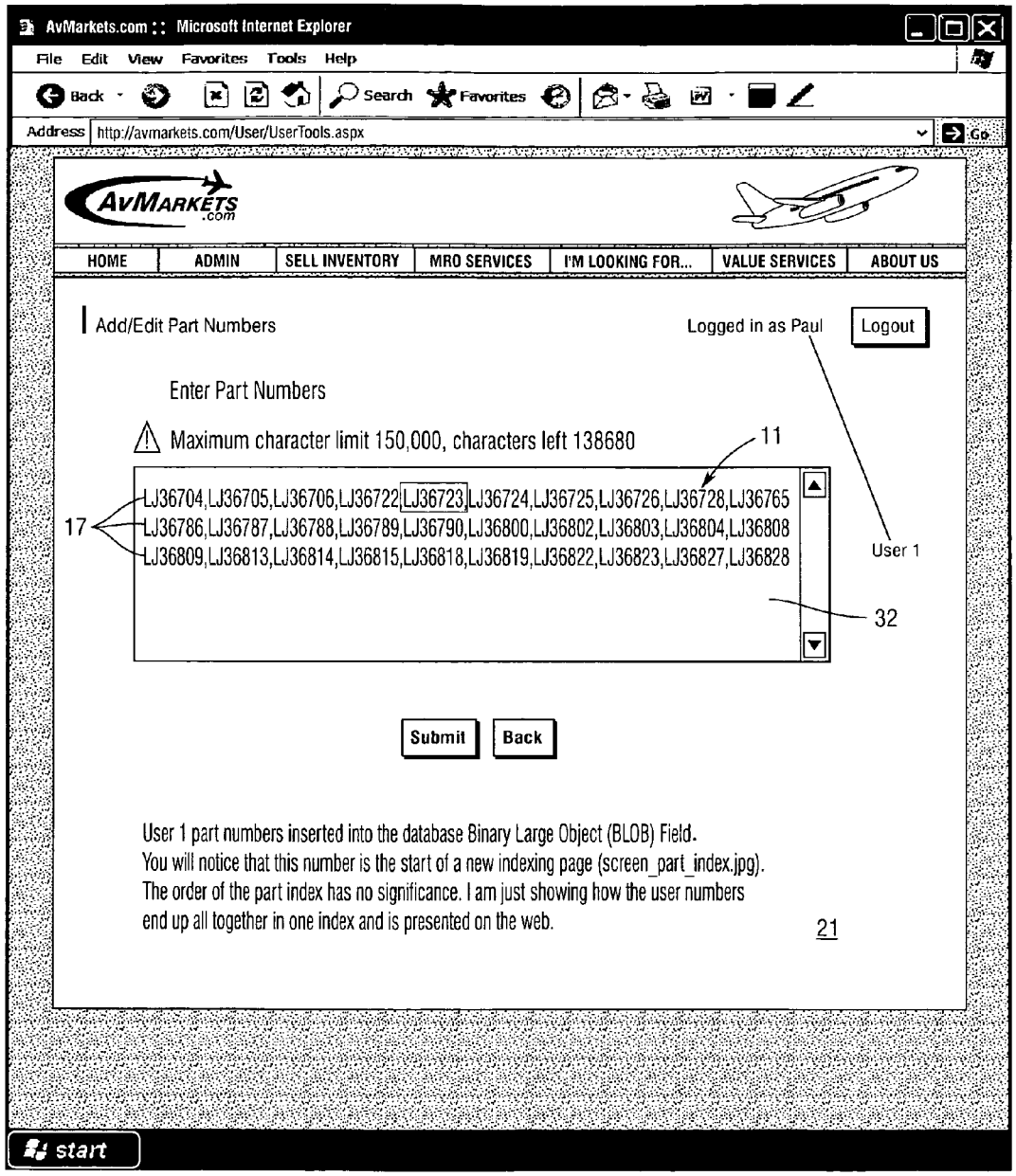
FIG. 3 is a screen shot of an exemplary data item input page for a first subscriber or authorized user of the system of the present invention.
Figure 4:
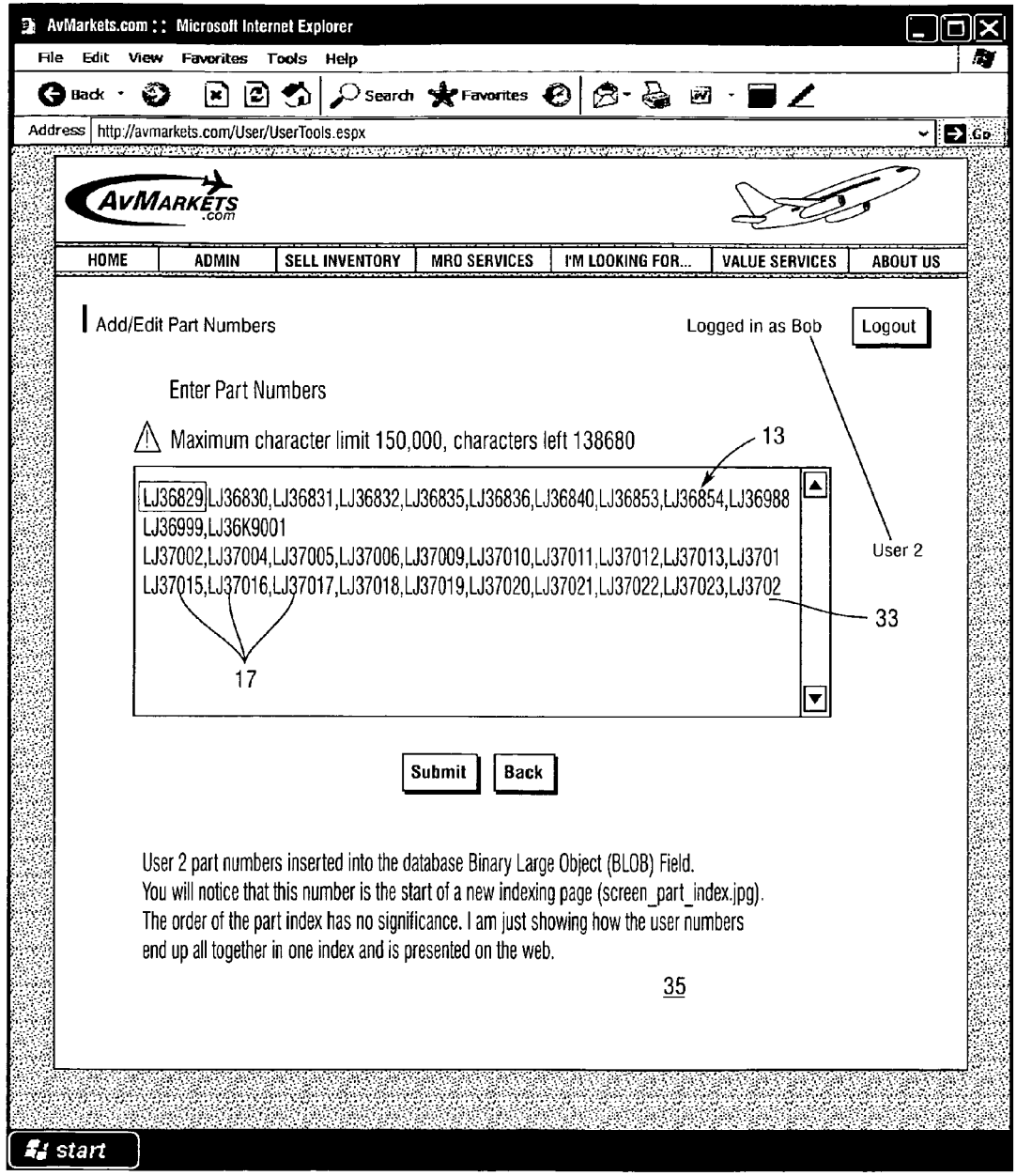
FIG. 4 is a screen shot of an exemplary data item input page for a second subscriber or authorized user of the system of the present invention.

Subscribers or authorized users 22/23 log into system 10 using a set of unique access credentials comprising a username 31 and password 37 via subscriber access page 30 (see FIG. 2). For example, subscriber 22 preferably inputs his respective data 11 comprising part numbers 17 into a Binary Large Object (BLOB) field 32 on the subscriber part number input page 21, as shown in FIG. 3. Likewise, subscriber 23 inputs his respective data 13 again preferably comprising part numbers 17 into a BLOB field 33 on the subscriber part number edit page 35, as shown in FIG. 4. A data retrieval software component 60 of system 10 parses subscriber 22 BLOB field 33 from database table 18 and inserts individual parts numbers into the temporary database table 62 one record for each part number. A deduplication software component 64 preferably compares the data from the temporary database table 62 to the master index table 19 and reduces the collected data to eliminate any duplicate data from the raw data collected from subscriber 22. After any duplicate data from temporary database table 62 is deleted, the reduced data from temporary database table 62 is appended to the end of master index 19 which is stored on database server 16. After the deduplication process described above using data retrieval software component 60, temporary database table 62, and deduplication software component 64 is completed for subscriber 22, the process repeats itself for subscriber 23 and continues until it has exhausted all other subscribers, authorized users and/or administrators of system 10. When the process is complete for all subscribers, authorized users and/or administrators of system 10, the master index table (19) is current.

The data appended to the end of master index 19 is displayed to the top of the part number index list of hyperlinked data 15, of part numbers 17 for example, contained on web page 14. For example, where subscriber 23 has input his data 13 prior to subscriber 22 inputting his data 11, the combined data would be listed on web page 14 as shown on FIG. 5 where data 11 from subscriber 22 is listed in front or on top of data 13 from subscriber 23. The data from each subscriber subsequently input into system 10 would be appended to the end of master index 19 and inserted at the front or top of the list 15 of hyperlinked data on web page 14.

Figure 6:
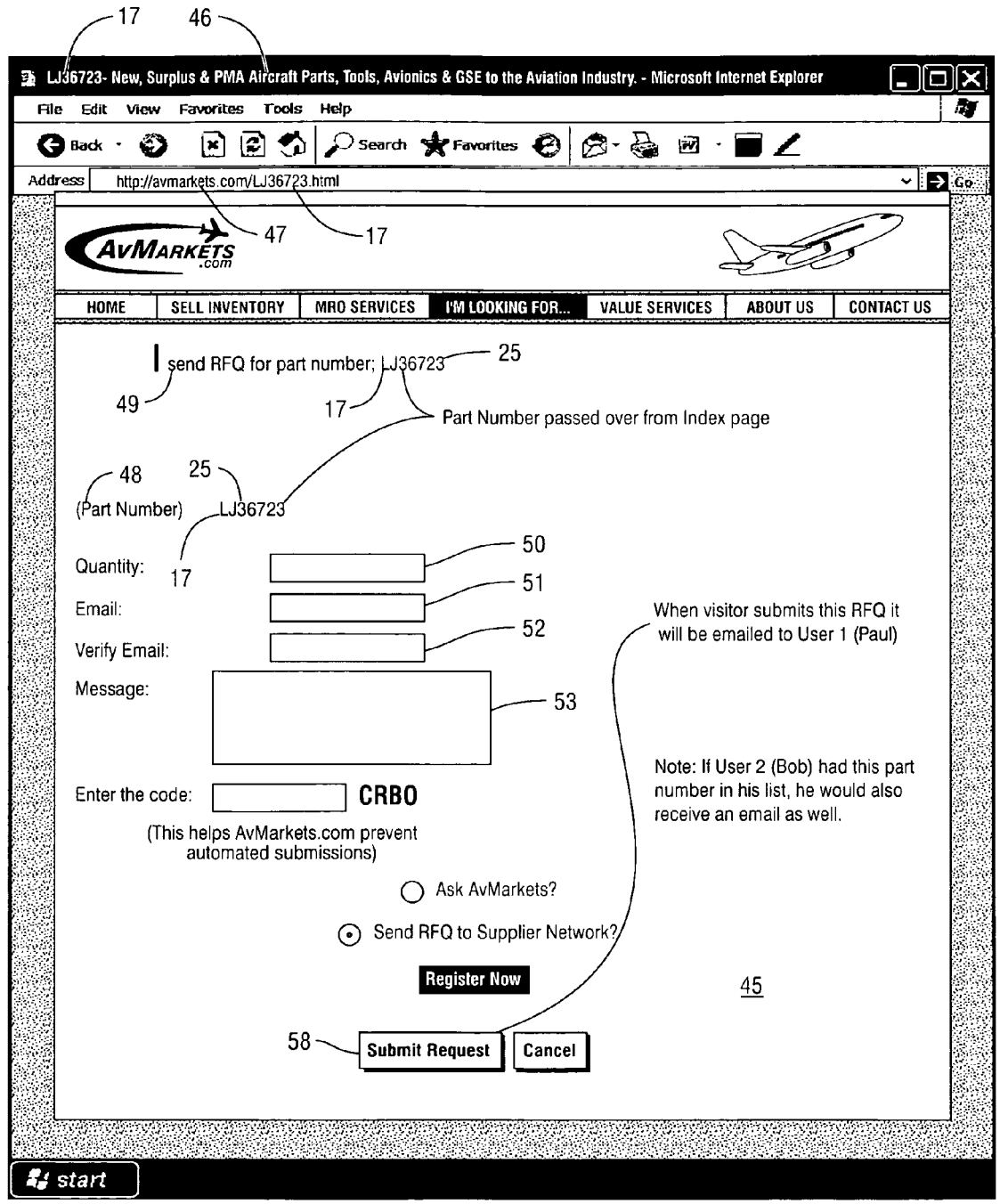
FIG. 6 is a screen shot of an exemplary dynamic Web page converted to a static Web page generated for a single part number from the list of hyperlinked data items from the Web page of FIG. 5.

The list of hyperlinked data 15 contained on main web page 14 is used to generate dynamic web pages, such as dynamic web page 45 shown on FIG. 6. Dynamic web page 45 was generated when a user or search engine spider or crawler 28 activated the hyperlink 29 for part number LJ36723 on web page 14. As shown on FIG. 6, the dynamic web page 45 generated for each part number 17 contains that part number 17 at numerous places including, the title header 46, the URL 47, in the body or text entry of Web page 45, in the part number field 48 and in the "Send RFQ" field 49, and preferably in at least one meta-tag associated with Web page 45. Because web page 45 contains little other substantive information other than the multiple instances of part number 17, in this case LJ36723, the information stored by a search engine spider or robot 28 will be highly pertinent to the part number 17 (here LJ36723) for which the dynamic Web page 45 was generated and a potential customer or a searcher 43 using an Internet search engine 28 such as Google or Yahoo to search for part number 17, for example LJ36723, is very likely to find Web page 45 highly ranked in the search results obtained.

While a typical URL for a dynamic Web page may look like: "http://subdomain.domain.com/pagename.asp?parm1=val1&parm2=val2", the URL 47 for Web page 45 preferably is converted, modified or rewritten such that any variable symbols are not shown and/or the URL 47 has a ".html", ".htm" etc, extension such that URL 47 appears to be or is a static URL. As a result, a spider or crawler finds this as a spider friendly page and is more like to index this page due to the format of the URL 47.

As shown on FIG. 6, Web page 45 prompts the user to submit a "Request For Quotation" for part number 17, LJ36723, by entering the quantity desired in field 50, and providing his E-mail address in fields 51, 52 along with any additional information and/or comments in field 53. If the user submits the information necessary on Web page 45 to request an RFQ, the RFQ is then sent by email through system 10 to the subscribers or other authorized users of the system 10 including an administrator of the system 10 that have submitted the particular part number 17, here LJ36723, to the system 10 as described above. If only one subscriber, authorized user or administrator had submitted the part number 17 in question, then only one RFQ will be sent out. However, if 100 or more entities selected from a group comprising system 10 subscribers, authorized users and/or the system 10 administrator had submitted the part number 17 in question, then 100 RFQs will be sent out; one to each of such group of subscribers and/or authorized users 22/23 that had submitted the part number to system 10. The subscribers, authorized users and/or the administrator of system 10 receiving an RFQ may then reply to the searcher/potential customer by sending a quote for the part number 17, here LJ36723, that meets the requested quantity terms and/or other included terms (such as price, delivery date, etc.). The quote is preferably sent electronically, by E-mail or other means, directly from the author of the quote to the potential customer. In this manner, the customer does not have to make numerous inquiries or fill out numerous requests for an RFQ, but only one such request need be made as prompted on Web page 45 for the sought after part number 17. Alternatively, or in addition, Web page 45 may include a prompt to the user to submit an order for part number 17, LJ36723.

As shown above, system 10 also greatly increases the potential for generating sales leads for each subscriber or authorized user offering a certain part number over other Websites that a customer must be aware of in order to go to such site and search for that part number 17. System 10 provides greater exposure of the part numbers 17 stored in the master index 19, as listed on Web page 14, since Web page 14 is easily and readily found and crawled by search engine spiders 28. In addition, the format of Web page 45 generated for each individual part number 17 of system 10 allows Web page 45 to be highly ranked in the search results produced by a search engine 28 for the sought after part number 17.

Figure 7:
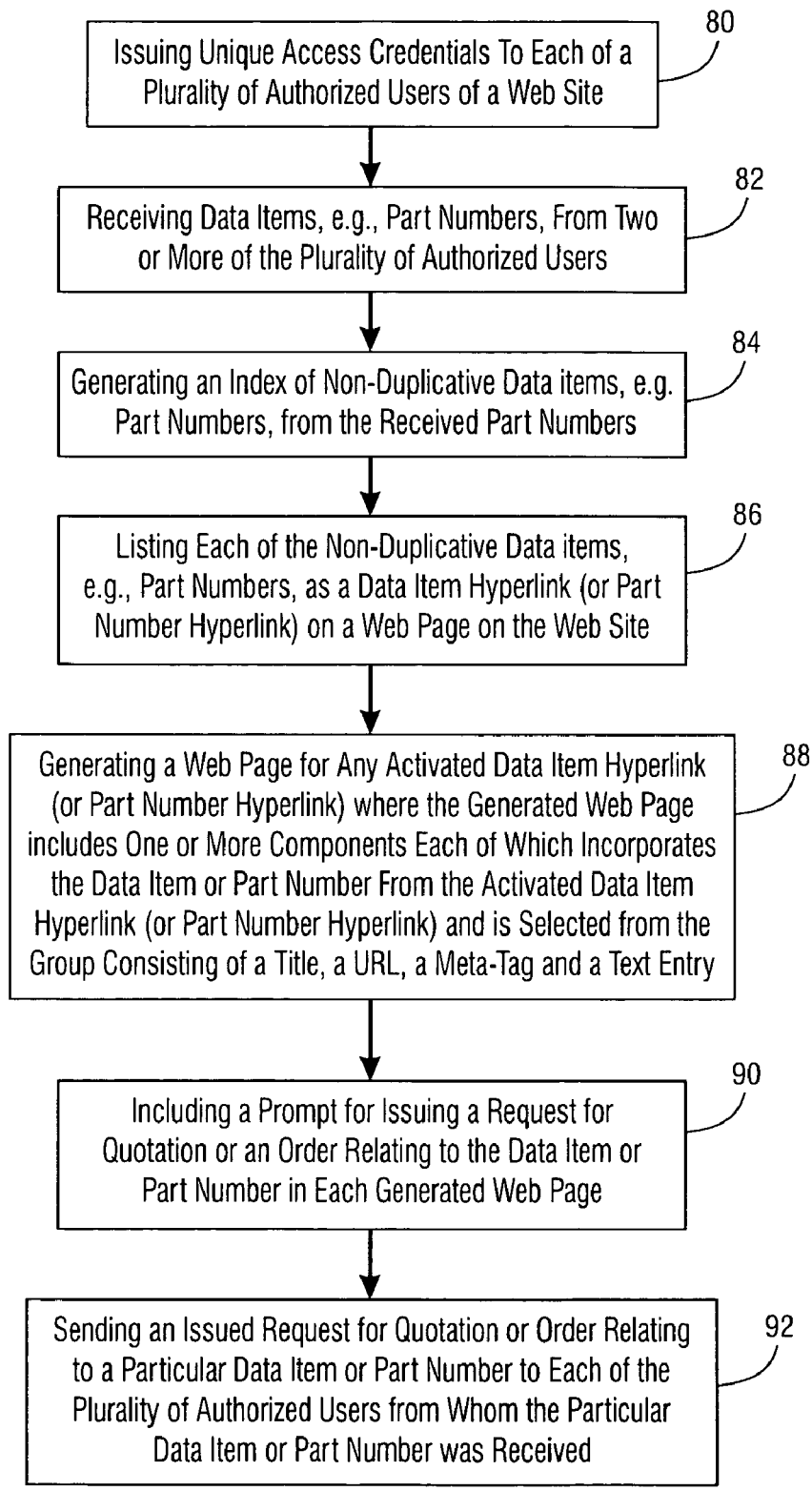
FIG. 7 is an exemplary flow chart showing a preferred computer implemented method of the present invention for generating increased numbers of leads, such as sales leads, via the Internet.

Referring next to FIG. 7, a flow chart illustrates a preferred method according to an embodiment of the invention for generating increased numbers of leads, such as sales leads for data items such as part numbers, ISBN numbers, automotive part numbers, electronic part numbers, phone numbers, zip codes, drivers license numbers, document numbers, keywords, etc., via the Internet. The method preferably includes issuing unique access credentials comprising a username 31 and password 37 to each of a plurality of subscribers and/or authorized users 22/23 of a Web page 14 at 80; receiving data items, such as part numbers 17, from two or more of the plurality of subscribers and/or authorized users 22/23 as at 82; generating an index 19 of non-duplicative data items, such as part numbers 17, from the received data items or part numbers 11 and 13 at 84; listing each of the non-duplicative data items or part numbers 17 as a part number hyperlink 29 on Web page 14 at 86; and generating a Web page 45 for any activated data item hyperlink or activated part number hyperlink 29 wherein the generated Web page 45 includes one or more components each of which incorporates the part number 17 from the activated data item hyperlink or activated part number hyperlink 29 and is selected from the group consisting of a title 46, a URL 47, a meta-tag (not shown) and a text entry 25 as shown at 88. The preferred method may also include a prompt 58 for issuing a request for quotation or for ordering a part represented by the data item or part number 17 in each generated Web page 45 as at 90; and sending an issued request for quotation or order relating to a particular part number 17, such as part number LJ36723 shown on FIGS. 3 and 5, to each of the plurality of subscribers and/or authorized users 22/23 from whom that part number 17 was received as at 92.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. For purposes of illustration, programs and other executable program components, such as the operating system, are illustrated herein as discrete blocks. It is recognized, however, that such programs and components reside at various times in different storage components of the computer, and are executed by the data processor(s) of the computer. The invention may also be practiced in distributed computing environments where tasks are performed by remote processing devices that are linked through a communications network. In a distributed computing environment, program modules may be located in both local and remote computer storage media including memory storage devices.

As various changes could be made in the above constructions, products, and methods without departing from the scope of the invention, it is intended that all matter contained in the above description and shown in the accompanying drawings shall be interpreted as illustrative and not in a limiting sense. The invention, therefore, is not to be restricted except in the spirit of the appended claims.

What is claimed is:

1. A method for generating increased numbers of sales leads for each of a plurality of sellers of parts via a network implemented by a computer executing computer readable instructions to perform the steps of:
   receiving one or more part numbers for said parts from each of the plurality of sellers;
   listing each of said part numbers as a part number hyperlink on a Web page; and
   generating a part number Web page for any activated part number hyperlink wherein the part number Web page includes two or more components each of which incorporates the part number from said activated part number hyperlink, wherein each such component is selected from the group consisting of a title, a URL, a meta-tag and a text entry.

2. The method of claim 1 wherein said receiving is implemented via one or more BLOB fields.

3. The method of claim 1 wherein each generated part number Web page includes a prompt for issuing a request for quotation or an order relating to one of said part numbers.

4. The method of claim 1 wherein each generated part number Web page has a static URL.

5. A method for generating increased numbers of sales leads for each of a plurality of sellers via a network implemented by a computer executing computer readable instructions to perform the steps of:
- receiving a plurality of data items from each of the plurality of sellers;
- generating an index of non-duplicative data items from the received plurality of data items;
- listing each of said non-duplicative data items as a data item hyperlink on a Web page; and
- generating a data item Web page for any activated data item hyperlink wherein the data item Web page includes two or more components each of which incorporates the data item from said activated data item hyperlink, wherein each such component is selected from the group consisting of a title, a URL, a meta-tag and a text entry.

6. The method of claim 5 wherein said receiving is implemented via one or more BLOB fields.

7. The method of claim 5 wherein each generated data item Web page includes a prompt for issuing a request for quotation or an order relating to one of said data items comprising a part number.

8. The method of claim 5 wherein each generated data item Web page has a static URL.

9. A method for generating increased numbers of sales leads for each of a plurality of sellers of parts via a network implemented by a computer executing computer readable instructions to perform the steps of:
- receiving one or more part numbers from each of the plurality of sellers;
- generating an index of non-duplicative part numbers from the received part numbers;
- listing each of the non-duplicative part numbers as a part number hyperlink on a Web page; and
- generating a Web page for any activated part number hyperlink wherein the generated Web page includes two or more components each of which incorporates the part number from said activated part number hyperlink, wherein each such component is selected from the group consisting of a title, a URL, a meta-tag and a text entry.

10. The method of claim 9 wherein said receiving is implemented via one or more BLOB fields.

11. The method of claim 9 wherein each generated Web page includes a prompt for issuing a request for quotation or an order relating to one of said non-duplicative part numbers.

12. The method of claim 9 wherein each generated Web page has a static URL.

13. A method for generating increased numbers of sales leads for parts via a network implemented by a computer executing computer readable instructions to perform the steps of:
- issuing unique access credentials to each of a plurality of authorized users of a Web site;
- receiving numbers of said parts from two or more of said plurality of authorized users;
- generating increased numbers of sales leads for selling the parts of the users by:
- generating an index of non-duplicative part numbers from the received part numbers;
- listing each of the non-duplicative part numbers as a part number hyperlink on a Web page of said Web site; and
- generating a Web page for any activated part number hyperlink wherein the generated Web page includes two or more components each of which incorporates the part number from said activated part number hyperlink, wherein each such component is selected from the group consisting of a title, a URL, a meta-tag and a text entry.

14. The method of claim 13 wherein said receiving is implemented via one or more BLOB fields.

15. The method of claim 13 wherein each generated Web page includes a prompt for issuing a request for quotation or an order relating to one of said non-duplicative part numbers.

16. The method of claim 15 further comprising:
- sending an issued request for quotation relating to a first part number to each of said plurality of authorized users from whom said first part number was received.

17. The method of claim 13 wherein each generated Web page has a static URL.

* * * * *

(12) POST-GRANT REVIEW CERTIFICATE (5th)

United States Patent
Pollastro

(10) Number: US 7,856,430 J1
(45) Certificate Issued: Mar. 11, 2015

(54) METHOD FOR GENERATING INCREASED NUMBERS OF LEADS VIA THE INTERNET

(75) Inventor: Paul J. Pollastro

(73) Assignee: AVMarkets Incorporated

Trial Number:

CBM2013-00025 filed May 29, 2013

Petitioner: Linkedin Corporation

Patent Owner: AVMarkets Inc

Post-Grant Review Certificate for:

Patent No.: 7,856,430
Issued: Dec. 21, 2010
Appl. No.: 11/944,153
Filed: Nov. 21, 2007

The results of CBM2013-00025 are reflected in this post-grant review certificate under 35 U.S.C. 328(b).

POST-GRANT REVIEW CERTIFICATE
U.S. Patent 7,856,430 J1
Trial No. CBM2013-00025
Certificate Issued Mar. 11, 2015

AS A RESULT OF THE POST-GRANT REVIEW PROCEEDING, IT HAS BEEN DETERMINED THAT:

Claims 1-3, 5-7, 9-11 and 13-15 are cancelled.

\* \* \* \* \*